United States Patent [19]

Durrell et al.

[11] Patent Number: 5,661,984
[45] Date of Patent: Sep. 2, 1997

[54] AUTOMOTIVE AIR CONDITIONER

[76] Inventors: Mark Durrell; Julianne Durrell, both of 1119 NE. 6th Ave., Camas, Wash. 98607

[21] Appl. No.: 441,484

[22] Filed: May 15, 1995

[51] Int. Cl.⁶ ........................................ F25D 5/00
[52] U.S. Cl. ................ 62/304; 62/244; 261/DIG. 41; 261/DIG. 43
[58] Field of Search ........................ 62/304, 315, 239, 62/244, 121; 261/99, 104, DIG. 3, DIG. 4, DIG. 41, DIG. 43

[56] References Cited

U.S. PATENT DOCUMENTS

| 2,230,020 | 1/1941 | Webster | 261/92 |
|---|---|---|---|
| 2,435,798 | 2/1948 | Rice et al. | 183/13 |
| 2,453,018 | 11/1948 | Kercheval | 261/34 |
| 2,501,273 | 3/1950 | Goetz | 98/2 |
| 2,767,638 | 10/1956 | Davis | 98/2 |
| 2,802,348 | 8/1957 | White | 62/140 |
| 3,007,841 | 11/1961 | Breiner et al. | 261/104 |
| 3,043,573 | 7/1962 | Chandler | 261/99 |
| 3,434,300 | 3/1969 | Rueth et al. | 62/239 |
| 4,566,290 | 1/1986 | Otterbein | 62/304 |
| 4,953,831 | 9/1990 | Albrecht | 261/102 |
| 5,168,722 | 12/1992 | Brock | 62/304 |

*Primary Examiner*—William Doerrler
*Attorney, Agent, or Firm*—Marger Johnson McCollom & Stolowitz

[57] ABSTRACT

An automotive, evaporative air conditioner having a unitary body, and a fixed, self-wetting water wicking assembly of a foraminous material which is self-wetting. The air conditioner is assembled by inserting wicking and filtering elements into the housing through the air inlet, allowing for use of a unitary housing.

15 Claims, 3 Drawing Sheets

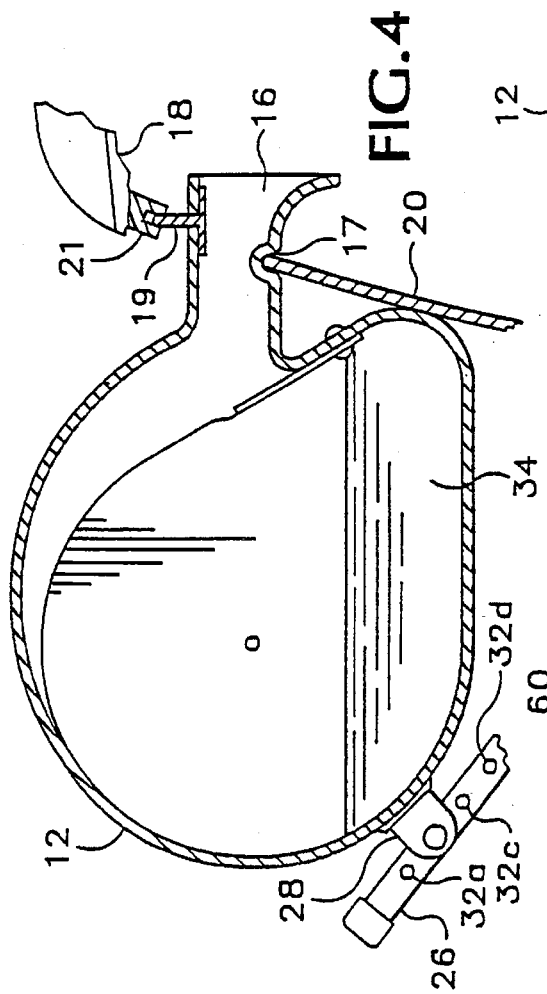
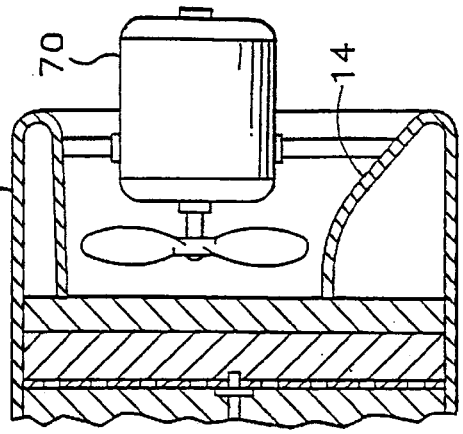
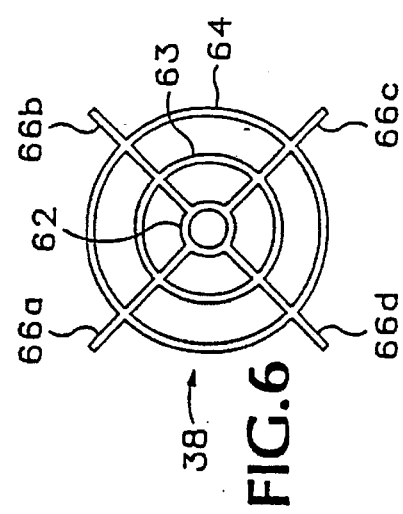
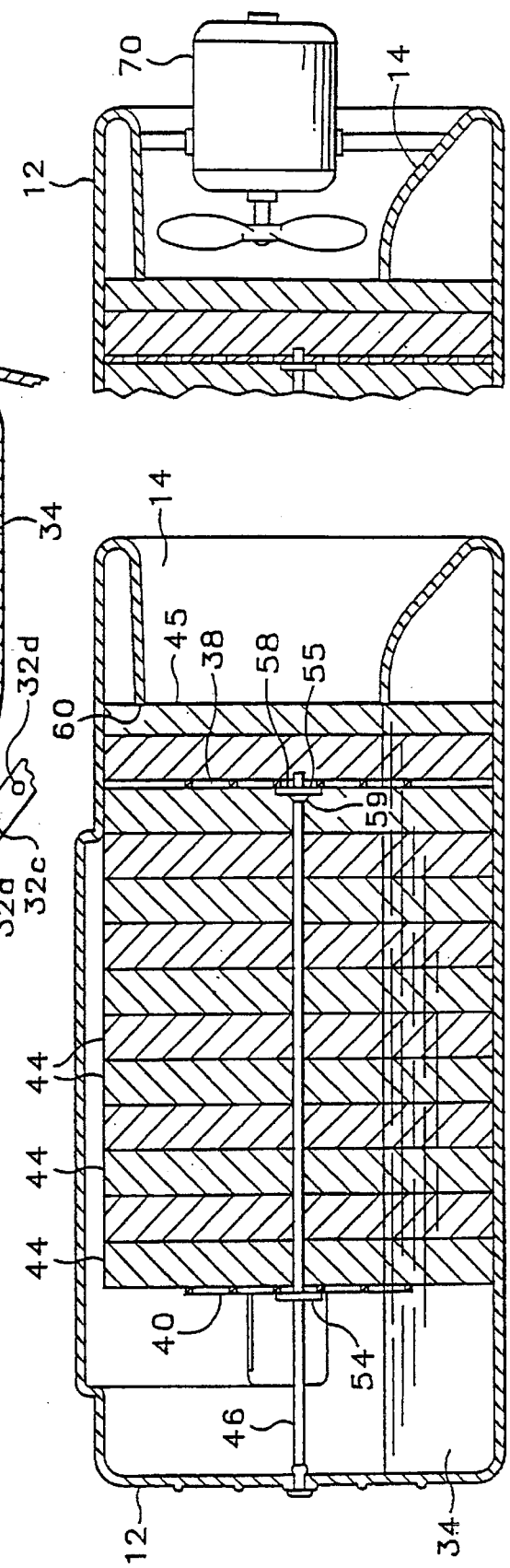

AUTOMOTIVE AIR CONDITIONER

BACKGROUND OF THE INVENTION

This invention relates to automotive air conditioners, and in particular to an improved evaporative-cooling type automotive air conditioner.

Evaporative-cooling is well-suited for air-conditioning in warm and dry climates, and has been applied to automotive air conditioner designs. U.S. Pat. No. 4,953,831 to Albrecht, U.S. Pat. No. 2,767,638 to Davis, U.S. Pat. No. 2,453,018 to Kercheval, U.S. Pat. No. 2,435,798 to Rice, et al, and U.S. Pat. No. 2,230,020 to Webster exemplify several such designs. Known automotive air conditioners which employ evaporative cooling have shortcomings which limit their utility and marketability, however. First, evaporative-cooling air conditioners are a form of direct contact heat exchanger, and must incorporate some means for contacting the warm incoming air directly with a liquid, usually water. The direct contact of the air and water may achieved by dispersing the water on an high-surface area member such as a mat which simultaneously provides the required high surface area and low resistance to flow of the incoming air. Efficient operation of the air conditioner requires that the mat present the largest profile to the incoming air, and that the entire mat is wetted top to bottom. This, combined with the fact that the water reservoir is most conveniently and economically located in the bottom of the air conditioner, means that water must somehow be transferred upwardly from the reservoir to the upper portions of the mat. The prior art teaches that the transfer of water to the mat is best be achieved by use of a pump, whether electrically driven as taught by Albrecht, hand-driven as taught by Kercheval, or mechanically driven as taught by Rice, et al. The prior art also teaches that a mat (Webster) or a water splashing device (Davis) can be rotated through the water reservoir to deliver water the mat. In each instance, the solutions taught in the prior art require moving parts and associated drive mechanisms, which add complexity and cost to the design. The second shortcoming of known designs is that each utilizes a multipart housing which also adds to manufacturing complexity and cost. The multi-part housings of the prior art must be finally assembled as a separate step after assembly and installation of the inner workings. Of equal or greater detriment is the fact that repair or replacement of internal components of multi-part housing designs requires dissembly of the housing. The device must therefore either be designed as a throwaway, i.e. one which is replaced rather than repaired, or the housing must be assembled utilizing removable fasteners such as nuts and bolts, again adding complexity and cost to the manufacture.

For each of these reasons a need remains for an improved air cooler which overcomes the shortcomings of the prior art.

SUMMARY OF THE INVENTION

The present invention is embodied in an automotive air conditioner having a housing with an air inlet, an air outlet, a plenum communicating with the air inlet and air outlet, a water reservoir, and surfaces adapted for interlockingly engaging a car door and window assembly. A self-wetting water wicking assembly is removably located in a fixed position in the housing and having an upper portion disposed in the plenum and a lower portion disposed in the water reservoir. An air filter element may be provided between the air inlet and the plenum. The water wicking assembly is made from a foraminous material having openings with dimensions selected to wick water from the water reservoir to the water wicking assembly upper portion, obviating the need for an operable mechanism for wetting the wicking elements. The self-wetting water wicking assembly is formed from a cellulosic material, a polymeric material, or a fibrous material. The water wicking assembly comprises a plurality of adjacent wicking elements. The water wicking element includes surfaces shaped to conform to an inner surface of the plenum.

The plenum has a cross-sectional dimension greater than a maximum cross-sectional dimension of the air inlet. One or more of the wicking elements has a cross-sectional dimension greater than the maximum cross-sectional dimension of the air inlet, and is deformable to a shape which is passable through the air inlet.

In one embodiment, the automotive air conditioner further includes a rod having first and second ends. The body has a rear wall with a hole formed therein. The water wicking assembly has a hole for slidably receiving said rod. The rod is inserted through the rear wall into the plenum and through the holes in the water wicking assembly to support them within the housing.

An automotive air conditioner according to the present invention may also include an electric fan communicating with said air inlet, and powered by a battery or a photovoltaic cell. The present invention is also embodied in a method of assembling an automotive air conditioner comprising the steps of forming a housing having an air inlet, an air outlet, a plenum communicating with the air inlet and air outlet, a water reservoir below the plenum, a rear wall, and a hole in the rear wall. A water wicking apparatus having a central hole is inserted into the plenum through the air inlet. A support having a hole is then inserted into the plenum through the air inlet. A rod is then inserted through the hole in the rear wall, through the water wicking apparatus, and through the pad support, the rod including first and second thrust washers axially fixed on the rod. The thrustwashers urge the wicking assembly and air filter forward against a rear edge of the air inlet, clamping the water wicking apparatus and the air filter into place. The rod is then prevented from moving rearwardly through the hole in the rear wall by a retainer such as a rivet being inserted into the hole. The invention will now be described in greater detail be reference to the drawings.

BRIEF DESCRIPTION OF THE DRAWINGS

FIG. 3 is a sectional view along line A—A in FIG. 2.

FIG. 4 is a sectional view along line B—B in FIG. 1.

FIG. 5 is an embodiment with a motor driven fan.

FIG. 6 is a plan view of the evaporative pad support.

DETAILED DESCRIPTION

Figure 1:
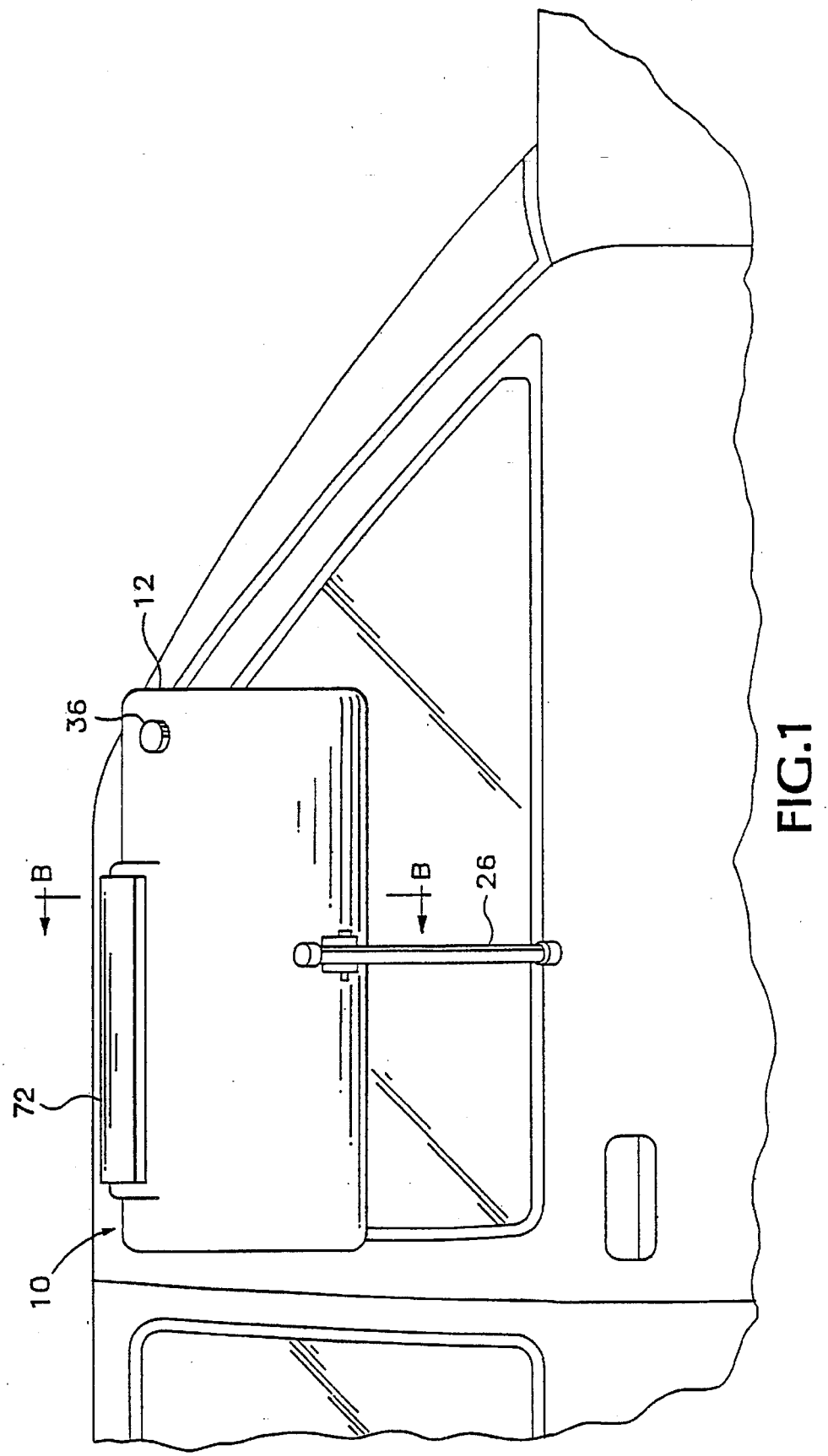
FIG. 1 is a side view of the automotive air conditioner shown installed in an automobile.
Figure 2:
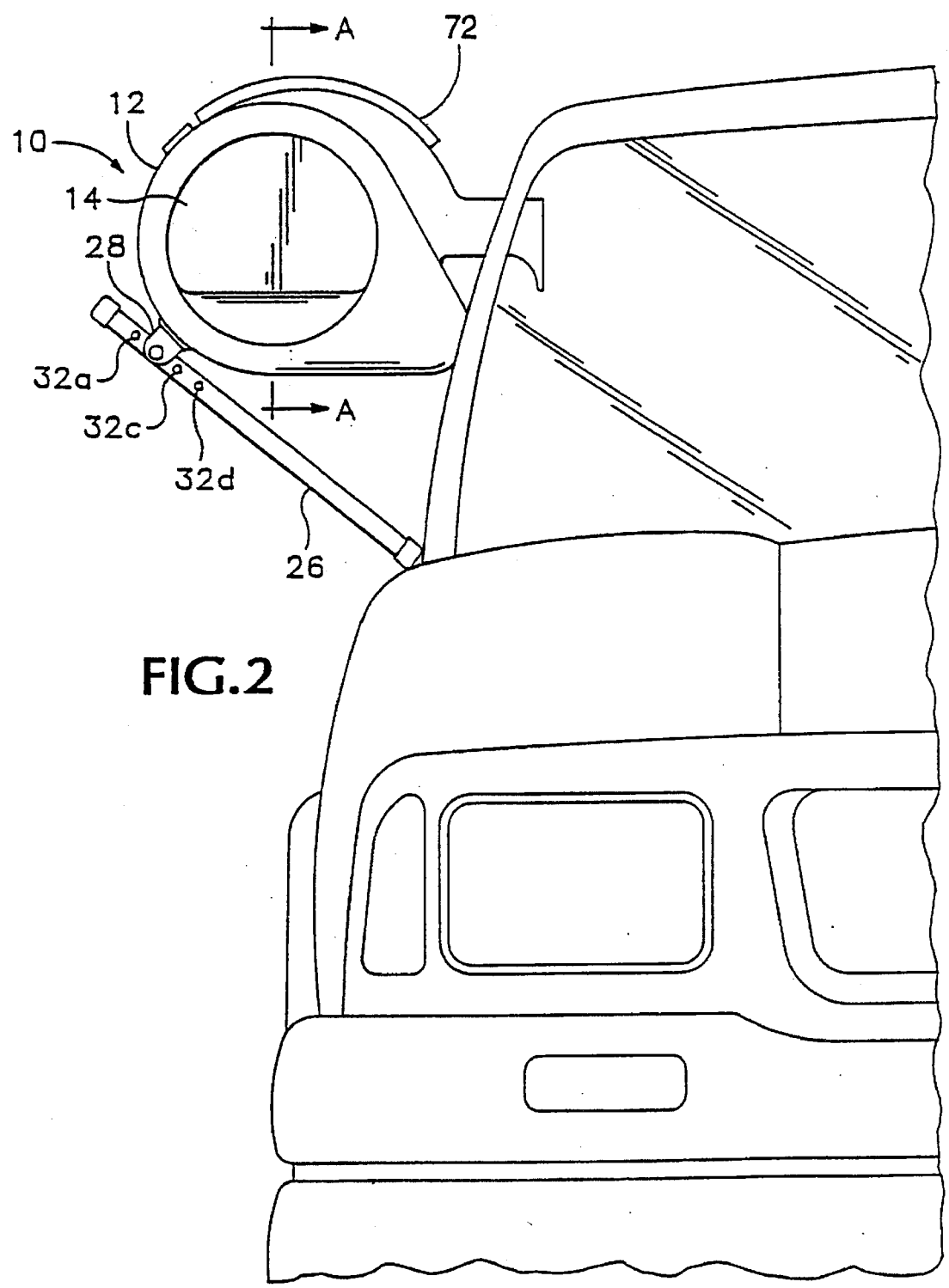
FIG. 2 is a front view of an automotive air conditioner according to the present invention shown in FIG. 1.

Referring now to FIGS. 1–3, an automotive air conditioner according to the present invention is shown generally at 10. The air conditioner includes a housing 12, which in the preferred embodiment, is of unitary construction and is preferably formed from polyethylene, although other materials could be substituted. The housing includes inlet 14 for receiving incoming air, and outlet 16 for delivering cooled air to the interior of the automobile. Outlet 16 includes groove 17 for receiving partially-raised window 20, and flange 19 for being received within a gasket 21 attached window frame 18. If outlet 16 is shorter than the length of the window 20, a gasket (not shown) may be inserted between the window and the window frame. Housing 12 is additionally supported by adjustable support 26 which rests on a body panel adjacent the base of the window. Support 26 is connected to lug 28 of housing 12 at one of holes 32a–32d selected to support housing 12 in a level position.

Referring now to FIG. 4, housing 12 includes a lower portion which serves as a water reservoir 34. Water is added to the housing through a fill cap 36 (FIG. 1) in an upper wall of housing 12. A series of flat, wicking evaporative pads 44 and an inlet filter element 45 are positioned in housing 12. Each evaporative pad 44 is approximately 1" thick and shaped to conform to the housing inner wall.

Evaporative pads 44 are preferably 1-inch thick and shaped to conform the inner surface of housing 12. The evaporative pads are formed from a laminated 8-layer expanded cellulosic material available from Columbus Industries, and which is designated as Model 1278. Applicants have discovered that this material embodies a combination of properties which cause water to be wicked upwardly via capillary action to upper portions of the evaporative pads. As a result, an automotive air conditioner according to the present invention can be made which requires no manual wetting of the evaporative pads, and which requires no moving parts for wetting the evaporative pads. Eliminating the need for moving parts otherwise required to wet the evaporative pads reduces the cost of manufacture, and at the same time increases reliability and durability.

Pad supports 38 and 40 are positioned within housing 12 at opposite ends of the evaporative pads. Pad supports 38 and 40 are of similar construction, each having three concentric wire rings 62, 63, and 64 attached to four radial wire arms 66a–d. Inner ring 62 is sized to receive compression rod 46 and to engage thrust washers 54 and 55. Ring 64 is sized to closely fit through air inlet 14. Arms 66a–d are sized to rest against the inner surface of housing 12 and to position the inner ring 62 near the center of the housing.

Compression rod 46 passes through pad supports 38 and 40 and through the center holes in evaporative pads 44. Thrust washer 55 urges pad support 38 against air inlet filter 45, which in turn is urged against the rear edge of air inlet 14. Thrust washer 54 in turn urges pad support 40 against the evaporative pads, which urges the evaporative pads against pad support 38. In this way, the evaporative pads and air filter are clamped into position in the housing. The evaporative pads are additionally supported in their concentric position within the housing by the compression rod 46, which is supported by the central wire ring the pad supports 38 and 40.

Applicants' invention provides an additional benefit over the prior art. Manufacture and assembly is greatly simplified by applicant's design which allows installation and assembly of the internal components through the air inlet 14. Assembly of the internal components through air inlet 14 in turn allows housing 12 to be a unitary molded housing which, except for the installation of lug 28 and fill cap 36, requires no assembly. As best understood by reference to FIG. 4, assembly is achieved as follows. Compression rod 46 is inserted through inlet 14 and into hole 54 until thrust washer 41 abuts rear wall 50. Rear pad support 40 is then tilted and inserted through air inlet 14 and slid onto rod 46. Then each evaporative pad 44 is tilted, folded slightly, and passed through air inlet 14. Once inside housing 12, each evaporative pad 44 is slid onto compression rod 46 and slid rearwardly as far as possible. As the evaporative pads are installed, compression rod 46 may be slid forward slightly as required to expose the forward end. In the embodiment shown in FIG. 3, after the evaporative pads are installed, thrust washer 58 is installed on compression rod 46 and slid rearwardly to abut a shoulder 59, which is preferably formed on compression rod 46 by flattening a short portion of the rod approximately ½" from the end. Then pad support 38 is inserted into housing 12 through air inlet 14 and slid onto compression rod 46. Finally, air inlet filter element 45 is inserted. Air inlet filter 14 is also flat and shaped to conform to the inner surface of housing 12, and while preferably formed from a fibrous fiberglass material, could be formed from any suitable cellulosic or polymeric filtering material. After the air filter has been installed, compression rod 46 is slid forward, sliding the evaporative pads and air inlet filter forward until the air inlet filter engages the rear edge 60 of air inlet 14. The length of compression rod 46 is such that at that point, the rearward end of the compression rod is within housing 12 and disengaged from hole 54. A pop rivet of suitable diameter is then installed in hole 54 to prevent compression rod 46 from passing therethrough. Thrust washers 54 and 55 are positioned such that evaporative pads 44 and air inlet filter 14 are lightly compressed against the rear edge of air inlet 14, and are thereby maintained in their respective axial positions. In an alternate embodiment, hole 54 may be threaded, and a small screw inserted instead of a pop rivet to achieve the same result. Such a design has the additional advantage of providing ready disassembly of the unit for servicing if required.

FIG. 5 shows an additional embodiment of the invention which additionally includes a motor-driven fan 70 for providing air flow while the automobile is stopped or travelling slowly. Fan 70 is preferably electrically connected to the electrical system of the car. As an alternative, fan 70 may be driven by a photovoltaic cell 72 mounted on the outside of housing 12 or mounted on the automobile.

It will be readily appreciated by those skilled in the art that modifications to the embodiments described above could be made without departing from the scope of the invention as defined by the following claims.

We claim:

1. An automotive air conditioner comprising;
   a housing having an air inlet, an air outlet, a plenum communicating with the air inlet and air outlet, a water reservoir, and surfaces adapted for interlockingly engaging a car door and window assembly;
   a self-wetting water wicking assembly removably located in a fixed position in the housing and having an upper portion disposed in the plenum and a lower portion disposed in the water reservoir;
   the plenum having a cross-sectional dimension greater than a maximum cross-sectional dimension of the air inlet;
   said wicking assembly having a first configuration including a cross-sectional dimension greater than a maximum cross-sectional dimension of the air inlet;
   said wicking assembly having a second configuration including a maximum cross-sectional area less than a minimum cross-sectional area of said air inlet; and
   said wicking assembly operable to said second configuration wherein said wicking assembly is passable through the air inlet, and operable to said second configuration to engage an inner surface of said plenum.

2. An automotive air conditioner according to claim 1 further comprising an air filter element disposed between the air inlet and the plenum.

3. An automotive air conditioner according to claim 1 wherein the water wicking assembly is made from a foraminous material, the foraminous material having openings with dimensions selected to wick water from the water reservoir to the water wicking assembly upper portion.

4. An automotive air conditioner according to claim 1 wherein the self-wetting water wicking assembly comprises a material selected from the group consisting of a cellulosic material, a polymeric material, and a fibrous material.

5. An automotive air conditioner according to claim 1 wherein the water wicking assembly comprises a plurality of adjacent wicking elements.

6. An automotive air conditioner according to claim 5 wherein the plurality of adjacent wicking elements comprises at least one wicking element having a shape selected to conform to an inner surface of the plenum.

7. An automotive air conditioner according to claim 1 further comprising an air filter disposed in said plenum.

8. An automotive air conditioner according to claim 1 further comprising:

a rod having first and second ends;

said housing having a rear wall, the rear wall having a hole;

said water wicking assembly having a hole adapted for slidably receiving said rod; and said rod slidably received within said water wicking assembly hole.

9. An automotive air conditioner according to claim 1 further comprising:

a fan communicating with said air inlet;

a motor operatively connected to said fan; and an electrical current source electrically connected to said motor; and a controller for controlling the operation of said motor.

10. An automotive air conditioner according to claim 9 wherein the electrical current source is selected from the group consisting of a battery and a photovoltaic cell.

11. A method of assembling an automotive air conditioner comprising the steps of:

forming a housing having an air inlet, an air outlet, a plenum communicating with the air inlet and air outlet, a water reservoir below the plenum, a rear wall, and a hole in the rear wall;

inserting a water wicking apparatus into the plenum through the air inlet, the water wicking apparatus having a hole formed therein;

inserting a support for the water wicking apparatus into the plenum through the air inlet, the pad support having a hole formed therein; and inserting a rod through the hole in the rear wall, through the water wicking apparatus, and through the pad support, the rod including first and second thrust washers axially fixed on the rod.

12. The method of claim 11 further comprising the steps of inserting an air filter having a hole therein into the plenum.

13. The method of claim 12 further comprising the step of clamping the water wicking apparatus and the air filter into frictional engagement.

14. The method of claim 13 wherein the step of clamping the water wicking apparatus and the air filter into frictional engagement comprises urging the rod toward the air inlet, thereby urging the first and second thrust washers against the water wicking apparatus and the air filter respectively.

15. The method of claim 13 wherein the step of clamping the water wicking apparatus and the air filter into frictional engagement further comprises limiting the axial movement of the rod by inserting a retainer into the hole in the rear wall.

* * * * *